United States Patent
Li et al.

(10) Patent No.: US 10,779,154 B2
(45) Date of Patent: *Sep. 15, 2020

(54) APPARATUSES AND METHODS FOR DISCOVERY MESSAGE FORMATS DISTINCTION

(71) Applicant: Telefonaktiebolaget LM Ericsson (publ), Stockholm (SE)

(72) Inventors: Yunxi Li, Järfälla (SE); Qianxi Lu, Beijing (CN); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,969

(22) Filed: Dec. 7, 2018

(65) Prior Publication Data
US 2019/0116481 A1 Apr. 18, 2019

Related U.S. Application Data

(63) Continuation of application No. 15/035,687, filed as application No. PCT/SE2016/050219 on Mar. 17, 2016, now Pat. No. 10,182,334.

(Continued)

(51) Int. Cl.
*H04W 72/04* (2009.01)
*H04W 8/00* (2009.01)

(52) U.S. Cl.
CPC .......... *H04W 8/005* (2013.01); *H04W 72/04* (2013.01)

(58) Field of Classification Search
CPC ...... H04W 8/005; H04W 72/04; H04L 9/3247
See application file for complete search history.

(56) References Cited

U.S. PATENT DOCUMENTS

| 9,635,705 B2 * | 4/2017 | Lu | H04W 60/00 |
| 2016/0269185 A1 * | 9/2016 | Stojanovski | H04L 9/3066 |
| 2017/0064534 A1 * | 3/2017 | Loehr | H04W 72/04 |

FOREIGN PATENT DOCUMENTS

| CN | 14244363 A | 12/2014 |
| WO | 2014/165675 A1 | 10/2014 |

(Continued)

OTHER PUBLICATIONS

International Search Report and Written Opinion dated Jun. 14, 2016 for International Application Serial No. PCT/SE2016/050219, International Filing Date—Mar. 17, 2016 consisting of 13-pages.

(Continued)

*Primary Examiner* — Wei Zhao
(74) *Attorney, Agent, or Firm* — Christopher & Weisberg, P.A.

(57) ABSTRACT

The disclosed embodiments herein relate to a method in a first communication device, a first communication device, a method in a second communication device and a second communication device and computer programs respectively. The method in the first communication device comprises: receiving from the second communication device, a discovery message at Layer 1 of the first communication device; identifying a message format of the received discovery message; decoding the received discovery message according to the identified message format; and sending the decoded discovery message to higher layers, L2/L3, of the first communication device.

16 Claims, 7 Drawing Sheets

Related U.S. Application Data

(60) Provisional application No. 62/137,868, filed on Mar. 25, 2015.

(56) References Cited

FOREIGN PATENT DOCUMENTS

| | | |
|---|---|---|
| WO | 2015/021267 A1 | 2/2015 |
| WO | 2015/021317 A1 | 2/2015 |

OTHER PUBLICATIONS

Andrew S. Tanenbaum: "Computer Networks, 1,9,15, 4th Edition" 23,29,30 In: "Computer Networks", Pearson Education International, Upper Saddle River, NJ 031549, XP055276946, ISBN: 978-0-13-038488-1 pp. 37-40, Jan. 1, 2003 consisting of 4-pages.
3GPP TR 22.803 V12.2.0 (Jun. 2013) 3rd Generation Partnership Project; Technical Specification Group Services and System Aspects; Feasibility study for Proximity Services (ProSe) (Release 12) Jun. 28, 2013 consisting of 45-pages.
3GPP TSG RAN WG1, Meeting #76, R1-140185, Prague, Czech Republic, Title: "LS Reply on Discovery Message Size," Response to: LS (S2-140046/R2-134591) on discovery message size from RAN2, Release 12, Work Item: ProSe/ FS_LTE_D2D_Prox. Source: SA2, To: RAN2, RAN1, SA1, SA3, Feb. 10-14, 2014 consisting of 2-pages.
3GPP TR 36.843 V12.0.1 (Mar. 2014) 3rd Generation Partnership Project; Technical Specification Group Radio Access Network; Study on LTE Device to Device Proximity Services; Radio Aspects (Release 12) Mar. 27, 2014 consisting of 50-pages.
3GPP TSG RAN2, Meeting #87. R2-143463, Dresden, Germany, Title: "On Discovery Resource Management," Agenda Item: 7.43. Source: ITRI, Document for Discussion and Decision, Aug. 18-22, 2014 consisting of 3-pages.
3GPP TSG-RAN WG2, #87Bis, R2-144548, Shanghai, P.R. China, Title: "Signaling Details for ProSe Direct Discovery ," Agenda Item: 7.3.3.1, Source: Qualcomm Incorporated, Document for Discussion and Decision, Oct. 6-10, 2014 consisting of 9-pages.
3GPP TSG.RAN WG2 #88, R2-145077, San Francisco, California, USA, Title: "Introduction of Usage Index Field of a Discovery TX Pool", Agenda item: 7.3.2.1, Source: LG Electronics Inc., Document for Discussion, Nov. 17-21, 2014 consisting of 3-pages.
European Search Report dated Feb. 21, 2020 and issued in corresponding European Patent Application No. 16 716 923.4, consisting of 7 pages.
Huawei Hisilicon, 3GPP TSG RAN WG2; R2-142664; Meeting #86 "Remaining L2 Issues for ProSe Discovery"; Document for: Discussion and Decision; Seoul, Korea, May 19-23, 2014, consisting of 6 pages.
3GPP TR 23.713 V1.0.0 (Feb. 2015) 3rd Generation Partnership Project; Technical Specification Group Services and System Aspects; Study on Extended Architecture Support for Proximity-Based Services (Release 13), consisting of 9 pages.
Chinese Office Action and English translation thereof, issued in corresponding Chinese Application No. 201680030458.9 dated Apr. 28, 2020, consisting of 15 pages.

\* cited by examiner

APPARATUSES AND METHODS FOR DISCOVERY MESSAGE FORMATS DISTINCTION

CROSS REFERENCE TO RELATED APPLICATIONS

The present application is a continuation of patent application Ser. No. 15/035,687 filed May 10, 2016, entitled "APPARATUSES AND METHODS FOR DISCOVERY MESSAGE FORMATS DISTINCTION" which is a U.S. National Stage Application of PCT/SE2016/050219, filed Mar. 17, 2016, entitled "APPARATUS AND METHODS FO DISCOVERY MESSAGE FORMATS DISTINCTION" which claims priority to and the benefit of the filing date of U.S. Provisional Application No. 62/137,868, filed on Mar. 25, 2015, all of which are incorporated herein by reference in their entireties.

TECHNICAL FIELD

The present disclosure relates to a first communication device and a method therein, of receiving a discovery or a Device-to-Device (D2D) discovery message from a second communication device and identifying a format of the discovery message. The present disclosure also relates to a second communication device and a method therein for generating a discovery or D2D message according to a message format and to transmit the discovery or D2D message to the first communication device.

BACKGROUND

Communication devices such as wireless device are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been developed in order to support high bitrates and low latency both for uplink and downlink traffic. All data transmission is in LTE controlled by the radio base station.

Recent developments of the 3GPP LTE facilitate accessing local Internet Protocol (IP) based services in the home, office, public hot spot or even outdoor environments. One of the important use cases for the local IP access and local connectivity involves the direct communication between devices in the close proximity, typically less than a few 10s of meters, but sometimes up to a few hundred meters, of each other.

This direct mode or Device-to-Device (D2D) enables a number of potential gains over the traditional cellular technique, because D2D wireless devices are much closer to one another than cellular wireless devices that have to communicate via cellular Access Point (AP), e.g., eNB:

Capacity gain: First, radio resources, e.g., Orthogonal Frequency Division Multiplexing (OFDM) resource blocks, between the D2D and cellular layers may be reused, i.e., reuse gain. Second, a D2D link uses a single hop between the transmitter and receiver points as opposed to the 2-hop link via a cellular AP, i.e., hop gain.

Peak rate gain: due to the proximity and potentially favorable propagation conditions, high peak rates may be achieved, i.e., proximity gain.

Latency gain: When the wireless devices, e.g., UEs, communicate over a direct link, eNB forwarding is short cut and the end-to-end latency may decrease.

The Feasibility Study on Proximity-based Services, in 3GPP, feasibility study for Proximity Services (ProSe), has identified services that may be provided by the 3GPP system based on UEs being in proximity to each other. The identified areas comprise services related to commercial services and Public Safety (PS) that may be of interest to operators and users. PS may comprise, e.g., all first responders in case of an emergency such as police, firemen, etc. Commercial services may comprise any consumer application that is not a PS device. Commercial services may also be referred to herein as non-PS services. The objectives of this feasibility study are to evaluate LTE D2D proximity services, as indicated in Table 1, indicates the type of activity to be performed by a wireless device, and the the coverage condition in which the activity is performed by the wireless device, that is whether the wireless device is within or outside of network coverage.

TABLE 1

|  | Within network coverage | Outside network coverage |
|---|---|---|
| Discovery | Non public safety & public safety requirements | Public safety only |
| Direct Communication | At least public safety requirements | Public safety only |

For a D2D system, message detection is a performance aspect, for which it is desirable to both increase the message detection probability and to reduce the false alarm probability.

Peer discovery may be the first step in the establishment of a D2D link, i.e., the devices discover the presence of their peer, which has partly similar functionality as the cell search procedure in LTE. Discovery may be made possible by one party sending a message signal, i.e., a discovery D2D message, and the other party scanning for such a message. By measuring the quality of the received message signal, estimation may be made whether the radio channel is good enough to establish a D2D link. Discovery messages may be transmitted periodically, carrying information about the identity of the transmitter UE. In the general procedure a neighbor wireless device is "discovered" once a message carrying the wireless device's identity is detected.

In more detail, the discovery procedure may be divided into different types in different dimensions. For example it may be divided into:

1. Open Discovery: where the Transmitter (Tx) wireless device may be discovered by all neighboring wireless devices in the proximity;

2. Restricted Discovery: where the Tx wireless device target at specific Receiver (Rx) wireless device(s), i.e., may only be discovered by specific Rx wireless device(s).

Thus, a discovery message, as used herein, may be understood as a message sent by a wireless device to be discovered by other radio network node/s, or to discover other radio network node/s, such as wireless device/s, over a D2D link.

The content of a discovery message, from a L1 perspective, is known as the payload of a discovery message. The payload is the sum of all the individual fields, each comprising a particular type of information, within the payload. The set of fields, i.e., payload fields, and corresponding length within the payload, is known as the payload format. The number of bits of the payload is known as the payload size.

The payload format may be different for different types of D2D discovery messages, as shown below.

1. For a non-public safety open discovery use case, the expected size of the information carried in discovery messages is currently assumed to be 192 bits, as shown in Table 2 below, which shows, for three different payload fields of information carried in discovery messages, the assessed length in number of bits.

TABLE 2

| Payload Field | Assessed Length |
|---|---|
| Prose Application Code | 160 bits |

TABLE 2-continued

| Payload Field | Assessed Length |
|---|---|
| ProSe Function IDentifier (ID) | 8 bits |
| PLMN ID | 24 bits |

2. For a Public safety case, the message structure depicted in Table 3 is expected. Table 3, in addition to the columns shown in Table 2, shows the payload, the the assessed length and the purpose.

TABLE 3

| Payload Field | Assessed Length | Purpose |
|---|---|---|
| Source L2 ID/Prose UE ID of source | e.g. 48 bits | To identify a single UE source of the information in the message. This may be used for subsequent communication or to send a reply in Model B of operation |
| Destination L2 ID | e.g. 48 bits | To identify a single UE or group of UEs that are intended recipients of the information (a single UE in responses for model B). |
| Message type | 8 bits | Type of discovery message |
| Prose Application ID | 64 bits | Needed to perform matching to the required service Set/Discovery criterion |
| UE mode of operation | 2 bits | Defines whether a Public safety ProSe UE is acting as a UE-to-network relay, UE-to-UE or both or not acting as relay |
| PLMN ID (Public Land Mobile Network) | 24 bits | The PLMN ID the ProSe UE is attached to. |
| Status bits | 4 bits | Some status/maintenance flags. |

3. Discovery message for relay UE discovery where a UE is either announcing itself as a relay or requesting connectivity to a relay node. Such different relay discovery messages may be associated to different discovery message types or formats e.g. relay-related message formats.

The terms Public Safety (PS) and National Security and Public Safety (NSPS), as used herein, indicate public safety. The terms consumer and commercial, as used herein, are meant to indicate non-public safety applications.

If considering that the discovery message may have different payload sizes. It may cause ambiguity to the receiver (Rx) due to e.g.: a mix of consumer, public safety, relay UEs discoverable on the same carrier; or that the Rx does not know if a carrier is commercial, PS or acting as a relay.

One solution would be to let Layer 1 at the receiver decode all received messages depending on the different types of messages and based on different assumption of the message format. However, this would lead to higher complexity and an increase in computational burden on the receiver. Further, if e.g. the payload size is the same but the payload field format is different, the Layer 2/3 of the receiver would not know how to interpret the fields of the message, thus causing ambiguity at the receiver. Layer 1 (L1) is a physical layer, wherein L2 is a Medium Access Control (MAC) layer, and wherein L3 is a Radio Resource Control (RRC) layer and a Packet Data Convergence Protocol (PDCP) layer.

SUMMARY

It is an object of embodiments herein to solve the above problems and to improve the performance in a wireless communications network by providing methods and first and second communication devices/apparatuses enabling identification of a format of a discovery or D2D message already at Layer 1 enabling the first and second communication devices to distinguish between different discovery formats or D2D message formats efficiently thereby reducing complexity, power consumption and processing time of the first communication device and of the second communication device.

According to an aspect of embodiments herein, there is provided a method in a first communication device/apparatus, the method comprising: receiving, from a second communication device/apparatus, a discovery or D2D message at Layer 1 of the first communication device; identifying a message format of the received discovery or D2D message and transmitting decoded discovery of D2D message to upper layer(s). According to an example, the decoded message to upper layer(s) may include an indication of the identified message format enabling the higher layer(s) of the first communication device to identity the message format. Example of discovery or D2D message formats may include a format for a relay discovery announcement; a format for a relay discovery request; a format for a discovery public safety message or a format for a discovery consumer related message.

According to an exemplary embodiment, identification of the message format may be performed before decoding of the received message. Hence, according to another aspect of embodiments herein, the method comprising: after identification of the message format of the discovery or D2D message received at Layer 1 from the second communication device/apparatus; decoding of the received discovery or D2D message according to the identified message format is performed followed by transmitting the decoded message to upper layers. As mentioned above, the decoded message to upper layers may include an indication of the identified message format enabling the higher layers of the first communication device to identity the message format.

According to an exemplary embodiment, identification of the message format may be performed after decoding of the received message. Hence, according to another aspect of embodiments herein, the method comprising: after receiving the discovery or D2D message at Layer 1, decoding the received message; identifying the message format of the decoded discovery or D2D message and transmitting the decoded message to upper layers. As mentioned above, the decoded message to upper layers may include an indication of the identified message format enabling the higher layers of the first communication device to identity the message format.

According to another aspect of embodiments herein, there is provided a first communication device comprising: a processing circuit or a processing module or a processor or means configured to identify a message format of a discovery or D2D message received, by means of a receiver circuit or receiver module, at Layer 1 from a second communication device/apparatus. The processing circuit or processing module or processor or means is further configured to transmit decoded discovery or D2D message to upper layers of the first communication device. According to an example, the decoded message to upper layer(s) may include an indication of the identified message format enabling the higher layers of the first communication device to identity the message format. Example of discovery or D2D message formats may include a format for a relay discovery announcement; a format for a relay discovery request; a format for a discovery public safety message or a format for a discovery consumer related message.

According to an exemplary embodiment, the processing circuit or a processing module or processor or means is configured to identify the message format before decoding of the received message. Hence, according to another aspect of embodiments herein, the first communication device is configured to: after identification of the message format of the discovery or D2D message received at Layer 1 from the second communication device/apparatus; decode, by means of the processing circuit or a processing module or processor or means, the received discovery or D2D message according to the identified message format followed by transmitting, by means of the processor, the decoded message to upper layers. As mentioned above, the decoded message to upper layers may include an indication of the identified message format enabling the higher layers of the first communication device to identity the message format.

According to an exemplary embodiment, the processing circuit or a processing module or a processor or means is configured to identify the message format after decoding of the received message by means of the processing circuit or processing module or processor or means. Hence, according to another aspect of embodiments herein, the first communication device is configured, by means of the processing circuit or processing module or processor or means, to decode the received message; identify the message format of the decoded discovery or D2D message and transmit the decoded message to upper layers. As mentioned above, the decoded message to upper layers may include an indication of the identified message format enabling the higher layers of the first communication device to identity the message format.

According to another aspect of embodiments herein, there is provided a method in a second communication device/apparatus, the method comprising: obtaining, from higher layer(s), at Layer 1 of the second communication device a discovery message for physical layer processing. A format of the discovery message is also indicated to Layer 1 by higher layer(s); the message further comprising encoding the received message according to the indicated message format and transmitting the encoded discovery message to a first communication device.

According to another aspect of embodiments herein, there is provided a second communication device/apparatus comprising: a processing circuit or a processing module or a processor or means configured to obtain, from higher layer(s), at Layer 1 of the second communication device a discovery or D2D message for physical layer processing and a format of the discovery or D2D message is indicated to Layer 1 by higher layer(s); the processing circuit or processing module or processor or means is further configured to encode the obtained message according to the indicated message format and the second communication device comprises a transmitter circuit or transmitter module configured to transmit the encoded discovery or D2D message to a first communication device.

An advantage with the embodiments herein is to avoid ambiguity of different message formats at the first and second communication device thereby reducing complexity, power consumption and processing time of the second communication device and first communication device.

BRIEF DESCRIPTION OF THE DRAWINGS

Examples of embodiments herein are described in more detail with reference to attached drawings in which.

DETAILED DESCRIPTION

In the following, a detailed description of the exemplary embodiments of the present invention is described in conjunction with the drawings, in several scenarios to enable easier understanding the solution(s) described herein.

Given that that the provision of LTE D2D proximity services, as indicated in Table 1, depends on the type of information associated with the messages to be sent by a second communication device, e.g., PS commercial or relay, it is beneficial for a first communication device to be able to distinguish the type of messages, associated with the service, each associated with a specific format.

The message payload may be different for different type of discovery or D2D messages in terms of different payload size and/or different payload field format.

As previously described, basing the distinction of the types of discovery messages on that the discovery message may have different payload size, may cause ambiguity to Rx (receiver), such as reception, due to, for example:

1) a mix of non-public safety, e.g., consumer, and public safety wireless devices are discoverable on the same carrier;

2) or that the Rx does not know if a carrier is non-public safety, e.g., commercial or PS.

Figure 1:
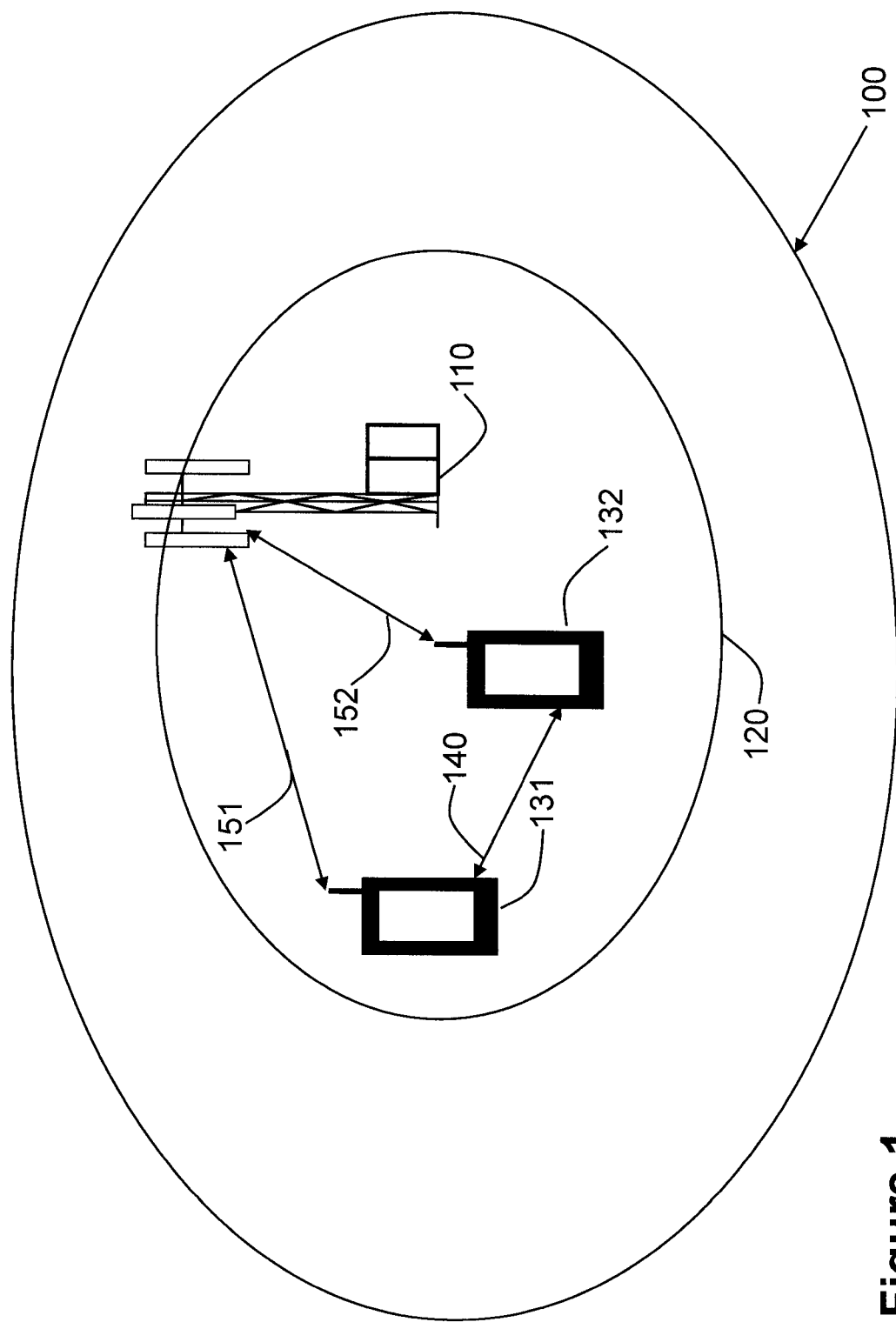
FIG. 1 is a schematic block diagram illustrating in a wireless communications network wherein embodiments herein may be applied.

FIG. 1 depicts a particular example of a wireless communications network 100, sometimes also referred to as a cellular radio system, in which embodiments herein may be implemented and in which D2D communications may be used. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system.

The wireless communications network 100 comprises a radio network node 110 which may be base station such as, e.g., an eNB, eNodeB, or a Home Node B, a Home eNode B, femto Base Station, BS, pico BS, Transmission Point (TP), or any other network unit capable to serve a wireless device or a machine type communication device in a wireless communications network 100. In some particular embodiments, the radio network node 110 may be a stationary relay node or a mobile relay node.

The wireless communications network 100 covers a geographical area which is divided into cell areas, wherein each cell area is served by a network node, although, one network node may serve one or several cells. In the non-limiting example depicted in FIG. 1, the network node 110 serves a cell 120. The network node 110 may be of different classes, such as, e.g., macro eNodeB, home eNodeB or pico base station, based on transmission power and thereby also cell size.

A number of wireless devices are located in the wireless communications network 100. In the example scenario of FIG. 1, only two D2D capable wireless devices are shown, wireless device 131 and wireless device 132. The wireless device 132, herein a first communication device, may be a mobile terminal, wireless terminal, mobile station, mobile telephone, cellular telephone, smart phone or a device-to-device (D2D) device which may operate as a relay D2D device for other D2D devices e.g. device 131. The second wireless device 131, herein a second communication device, may also be a mobile terminal, wireless terminal, mobile station, mobile telephone, cellular telephone, smart phone or a device-to-device (D2D) device which may operate as a relay D2D device for other D2D devices e.g. device 132. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, Machine Type Communication (MTC) devices such as sensors, e.g., a sensor equipped with UE, just to mention some examples.

The wireless devices 131 and 132 are capable of communicating using wireless D2D communication over a D2D link 140. The wireless device 131 is configured to communicate with the network node 110 over radio link 151. The radio network node 132 may communicate with the network node 110 over a radio link such as e.g. radio link 152.

Embodiments herein provide methods that allow distinction between the D2D discovery message formats and address the issue listed previously. Any reference herein to Rx, or first communication device is understood to apply to wireless device such as wireless device 132. Any reference herein to Tx or second communication device is understood to apply to wireless device such as the wireless device 131.

A reference herein to a discovery message, may be made by using the term "message" or "D2D message".

In the following, embodiments herein are described by focusing on the case where different discovery or D2D message types are possible: For example, one for PS wireless device discovery, one for commercial wireless device discovery and one for relay discovery. However, any of the techniques may be readily applied to additional message formats, both for discovery or other purposes. A discovery D2D message format may also be referred to herein as a discovery message type.

For example a message format may be used for relay device discovery, where a wireless device is either announcing itself as a relay or requesting connectivity to a relay node. Such relay discovery messages may be associated to different discovery message types or formats. Additional discovery messages may relate to group-check for discovery of groups of users or devices involved in a group or broadcast communication.

The following embodiments provide ways to differentiate between different discovery message formats. This is performed at Layer 1 (L1) at the first communication device receiving the discovery D2D message. It should be noted that this is possible even before decoding, such as channel decoding of the discovery message content.

At the second communication device, the higher layers may indicate to L1 the format of the discovery message to be transmitted, so that L1 may apply the correct processing and transmission parameters.

At the first communication device, L1 may indicate to higher layers the detected format of the discovery message, so that higher layers may interpret the content fields correctly.

According to an embodiment, the mapping between the processing and transmission parameters of discovery messages and the formats of discovery messages may be determined by a configuration known by both the first and second communication devices, or may be at least partly configured by some network node (e.g. a eNB), such as the network node 110.

The term "format of the discovery D2D message" or "message format" may indicate e.g. the payload size and the mapping of different information fields of the payload.

Some embodiments are provided that may be applicable for the scenario where the discovery message payload sizes are different for different formats. In this case, some methods are addressed in the following to avoid the decoding complexity. However, the application of these embodiments is not limited to the case where payload sizes are different.

Figure 2:
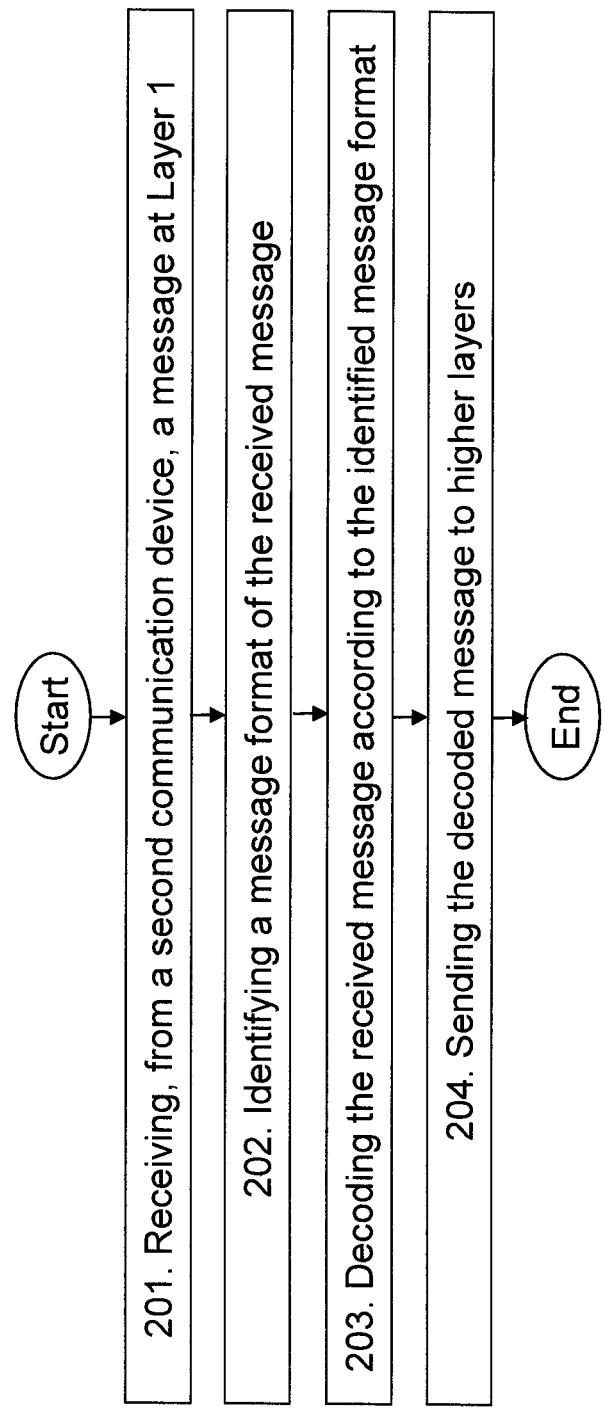
FIG. 2 is a flowchart depicting some exemplary embodiments of a method performed by a first communication device.

Referring to FIG. 2 there is illustrated the main steps of a procedure/method performed by a first communication device e.g. wireless device 131 according to some exemplary embodiments herein. The method comprising:

(201) receiving, from a second communication device, a discovery or D2D message at Layer 1 of the first communication device;

(202) identifying a message format of the received message;

(203) decoding the received message according to the identified message format; and (204) sending/transmitting the decoded message to higher layers (L2/L3) of the first communication device.

According to an example, the decoded message to upper layers may include an indication of the identified message format enabling the higher layers of the first communication device to identify the message format. As previously described, examples of discovery or D2D message formats may include a format for a relay discovery announcement; a format for a relay discovery request; a format for a discovery public safety message or a format for a discovery consumer related message.

According to an exemplary embodiment, identification of the message format may be performed by mapping the message format to at least one reference signal sequence associated with the received discovery message. For example, the first communication device may detect one or more parameters associated to one or several reference signal sequences and from such parameters determine the message format of the received discovery message.

For example, the first communication device may be pre-configured with at least one reference signal sequence and the mapping may be performed based on the reference signal sequence. For example, sequence 1 for message format 1, sequence 2 for message format 2, sequence 3 for message format 3, etc. A sequence maybe a base sequence, a group sequence, a sequence identity, a scrambling sequence, a cyclic shift, an orthogonal cover code etc. It should be noted that identification may be performed during channel estimation. In this way, by correlating the received reference signal/message to different hypothesis (e.g. with sequence 1, sequence 2 and/or sequence 3), the first communication device may know which format the received message uses. For example, if a relay announcement message received by the first communication device uses a distinguishable scrambling sequence, the first communication device may identify the received relay announcement message by associating it with the distinguishable scrambling sequence.

According to another exemplary embodiment, identification of the message format may be performed via a resource mapping scheme by mapping between resource mapping schemes of the discovery message and the associated message format. For example, mapping scheme 1 for message format 1; mapping scheme 2 for message format 2, mapping scheme for message format 3 etc. An example of a mapping scheme may be a resource location of the message. For example, the messages of different formats may be located at different time/frequency locations in a subframe carrying the message. For example, a PS message may be located at resource pool 1; a commercial message may be located at resource pool 2 and a relay announcement message may be location at resource pool 3. The resource pools may be mutually orthogonal to each other. Thus, depending on the resource location where the first communication device detects a certain discovery message, the message format is identified or obtained.

Another example of a mapping scheme may be guard period/subcarrier location. For example, the first communication device may identify the message format depending on the location of the guard period/subcarrier in the received discovery message as well as the length of the guard period/subcarrier. For example, in a resource unit comprising X subcarriers and Y symbols, where X and Y are design parameters, a guard period (in time) or guard band (in frequency) may be defined. The first communication device may identify the format of the received message including the guard time or guard period by e.g. determining the length of the guard period at the end of the message and then identify the format type. For example, the length of the guard period or guard band may be specific to the type of message received.

Another example of a mapping scheme is to make use of different cyclic prefix (CP) length for the identification. For example, different message formats may be associated to different CP lengths. As an example, a message format with a predefined length K may be identified as belonging to a PS message; a message format with a predefined length N may be identified as belonging to a commercial message; a message format with a predefined length M may be identified as belonging to relay message. K, N and M are design parameters or may be defined in a 3GPP standard specification.

In another exemplary embodiment, the second communication device/apparatus may provide the first communication device with information on the used message format by means of a dedicated signalling field that may be multiplexed with the discovery message that is received by the first communication device.

As previously described, the first communication device is configured to identify the message format of the received before decoding the receive message. In alternative exemplary embodiment, the receive device may attempt to decode the message prior to identifying the message format. This may be the case when the message payload size is unified.

Figure 3:
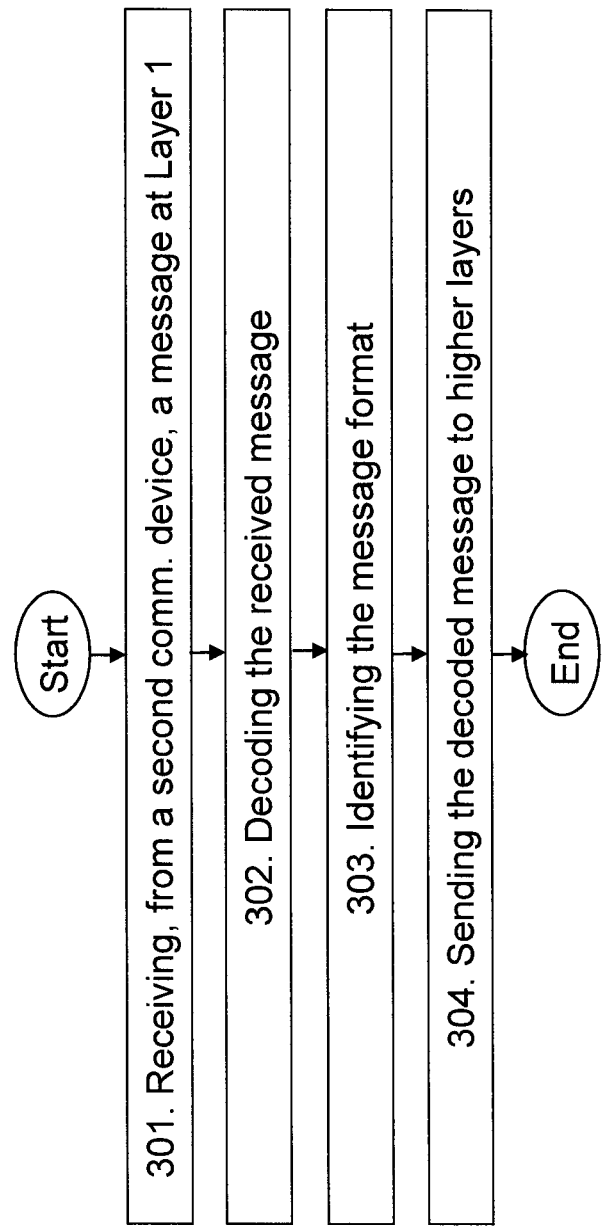
FIG. 3 is a flowchart depicting other exemplary embodiments of a method performed by the first communication device.

Referring to FIG. 3 there illustrated an example of the embodiment described above i.e. when the decoding is performed prior to identifying the message format. As shown, the method comprises:

(301) receiving, from a second communication device, a message at Layer 1;

(302) decoding the received message;

(303) identifying a message format of the received message;

Assuming that the received signal has been scrambled by the second communication device, the first communication device in this step may determine the message format by first descrambling the received message and perform a CRC (Cyclic Redundancy Check). Different scrambling schemes may be used. For example and as previously described, a mapping may be performed between a scrambling scheme and message format, e.g. scrambling scheme 1 for format 1 and scrambling scheme 2 for format 2 and scrambling scheme for format 3. The first communication device is configured to perform the descrambling more than once according to different schemes for the different formats. Assuming that the CRC is successful, the received would identify the message format.

For example, the first communication device may perform CRC with PS discovery CRC and if the CRC fails, the first communication device continues by performing CRC with non-PS discovery CRC. If the CRC fails, the first communication device performs a CRC with relay announce CRC and if that fails, the UE performs CRC check with relay request CRC and if that succeeds the first communication device identifies the message format as belonging to a relay request message.

Detection or identification of the received signal or message at L1 is performed to differentiate the message formats e.g. a format of a relay announcement message; a format of a relay request message; a format of a non-PS or commercial message or a format of a PS message. The identification may be performed according to any of the previously described embodiments.

When the message format has been identified, the method further comprises as shown in FIG. 3, sending/transmitting (304) the decoded message to higher layers of the first communication device and optionally indicate the format message to the higher layers in order to avoid ambiguity of interpretation at the higher layers.

The first communication device may decide the order of CRC to be used based on the estimation of the possibility of message type being received. The first communication device may try the CRC in a decreasing order of the corresponding possibility. E.g. the first communication device may maintain a table as below. In this case, the order of CRC to be checked is relay announcement firstly, then commercial discovery, then relay request; and the first communication device may decide not try CRC for PS discovery:

| Message type | possibility |
| --- | --- |
| relay announcement | 10 |
| relay request | 3 |
| commercial discovery | 5 |
| PS discovery | 0 |

When a certain type of message is expected by the first communication device, the corresponding CRC may increase. E.g. a discovery message may be repeated several times with some pre-defined pattern both in time domain and in frequency domain. If the first communication device has received commercial discovery messages before, and according the pattern of the message being transmitted, is expecting to receive a commercial discovery message within a predefined time interval, the first communication device may check commercial discovery message CRC earlier than others. If CRC for commercial discovery message fails, the first communication device may try other CRCs for other types of messages.

Assuming that the first communication device is out of coverage, the possibility or probability that PS discovery message is received first is more prioritized than the possibility for receiving a commercial discovery message since commercial discovery is not supported in out of coverage scenarios.

Assuming that a first communication device is acting as a ProSe or D2D relay, the possibility for relay request should increase. When a first communication device is not acting as a ProSe or D2D relay, the possibility for relay request should be 0.

Figure 4:
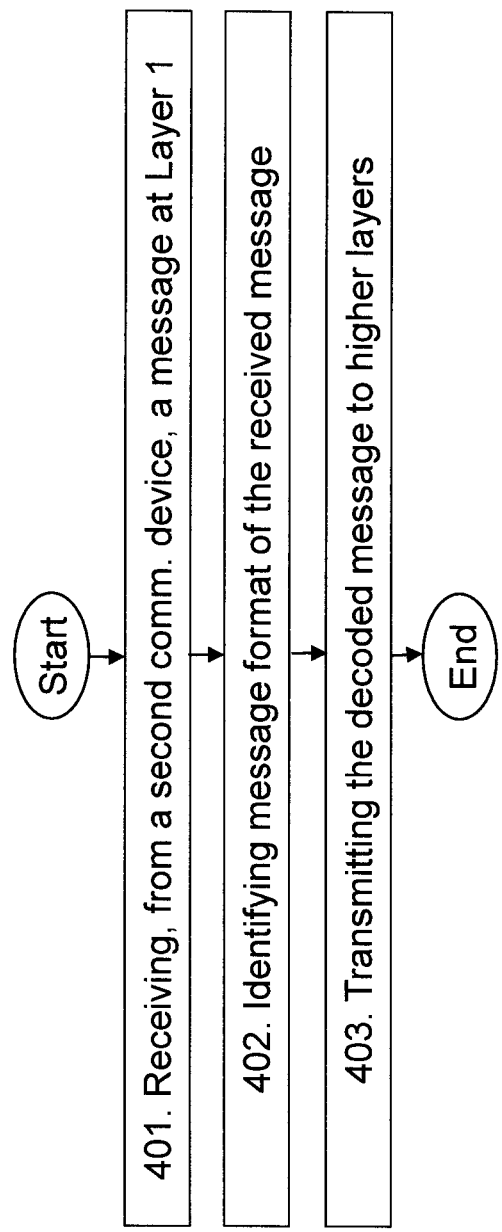
FIG. 4 is a flowchart depicting some embodiments of a method performed by the first communication device.

Referring to FIG. 4 there is illustrated main method steps performed by the first communication device according to previously described embodiments.

As shown, the method comprises:

(401) receiving, from a second communication device, a discovery or D2D message at Layer 1;

(402) identifying message format of the received message; and (403) transmitting/sending decoded message to higher layers.

As previously described in conjunction with FIG. 2, identifying of the message may be performed before decoding of the received message, alternatively, the received message is decoded before the format of the message is identified as described above in conjunction with FIG. 3.

Figure 5:
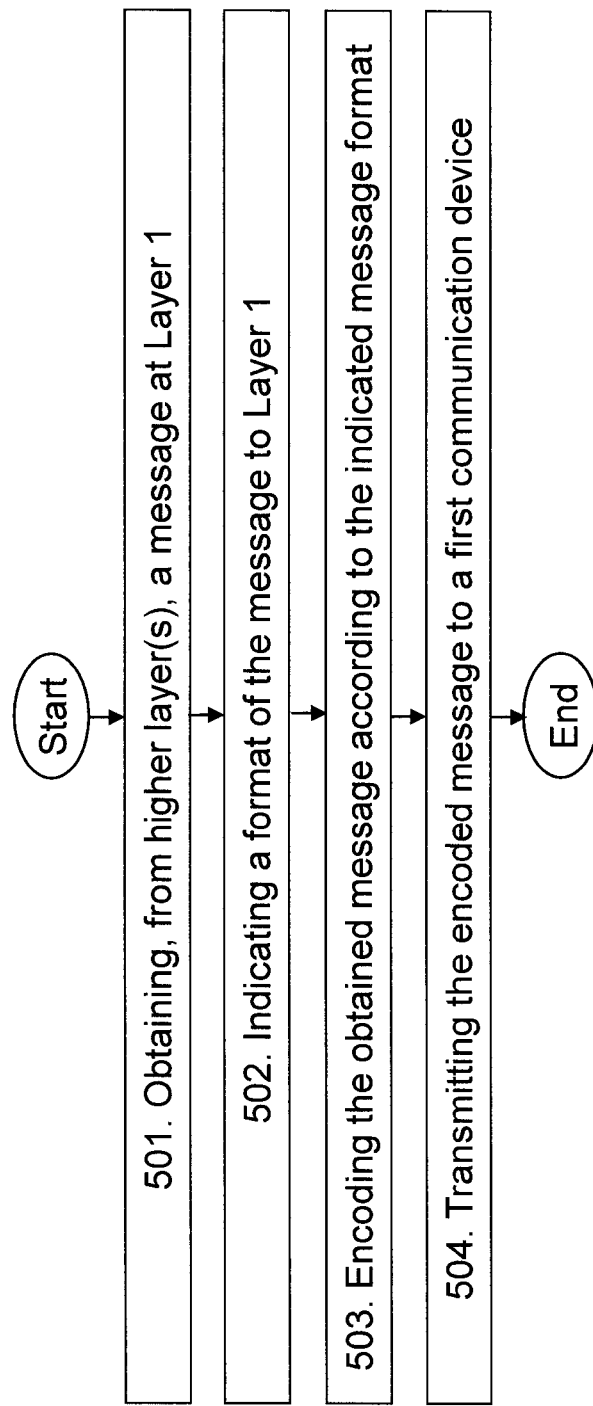
FIG. 5 is a flowchart depicting embodiments of a method performed by a second communication device.

Referring FIG. 5 there is illustrated main steps performed by a second communication device according to embodiments herein. As shown, the method comprises:

(501) obtaining, from higher layer(s) of the second communication device, a discovery or D2D message at Layer 1 for physical layer processing;

(502) indicating, by higher layer(s), a format of the discovery message to Layer 1;

(503) Encoding the obtained message according to the indicated message format;

(504) transmitting the encoded message to a first communication device.

According to an exemplary embodiment, the second communication device may use different reference signal sequences for different message formats enabling the first communication device to map the message format with a reference signal sequence as previously described, thereby identifying the message format transmitted by the second communication device. The reference signal sequence being associated with the transmitted discovery or D2D message.

According to another exemplary embodiment, the second communication device may use different resource mapping schemes; scrambling schemes, guard period/subcarrier or cyclic prefix (CP) or CRC for different message formats as previously described.

As previously described, the message formats may comprise formats such as a public safety format, a non-public safety (i.e. commercial) format and a relay message format. All these message formats may be viewed as D2D message formats or discovery D2D message formats. The format of a discovery or D2D message may be understood as a payload format of the discovery (D2D) message, which may be different for a public safety format a non-public safety format, and a relay format. The public safety format may correspond to a first payload format, and the non-public safety format may correspond to a second payload format.

Figure 6:
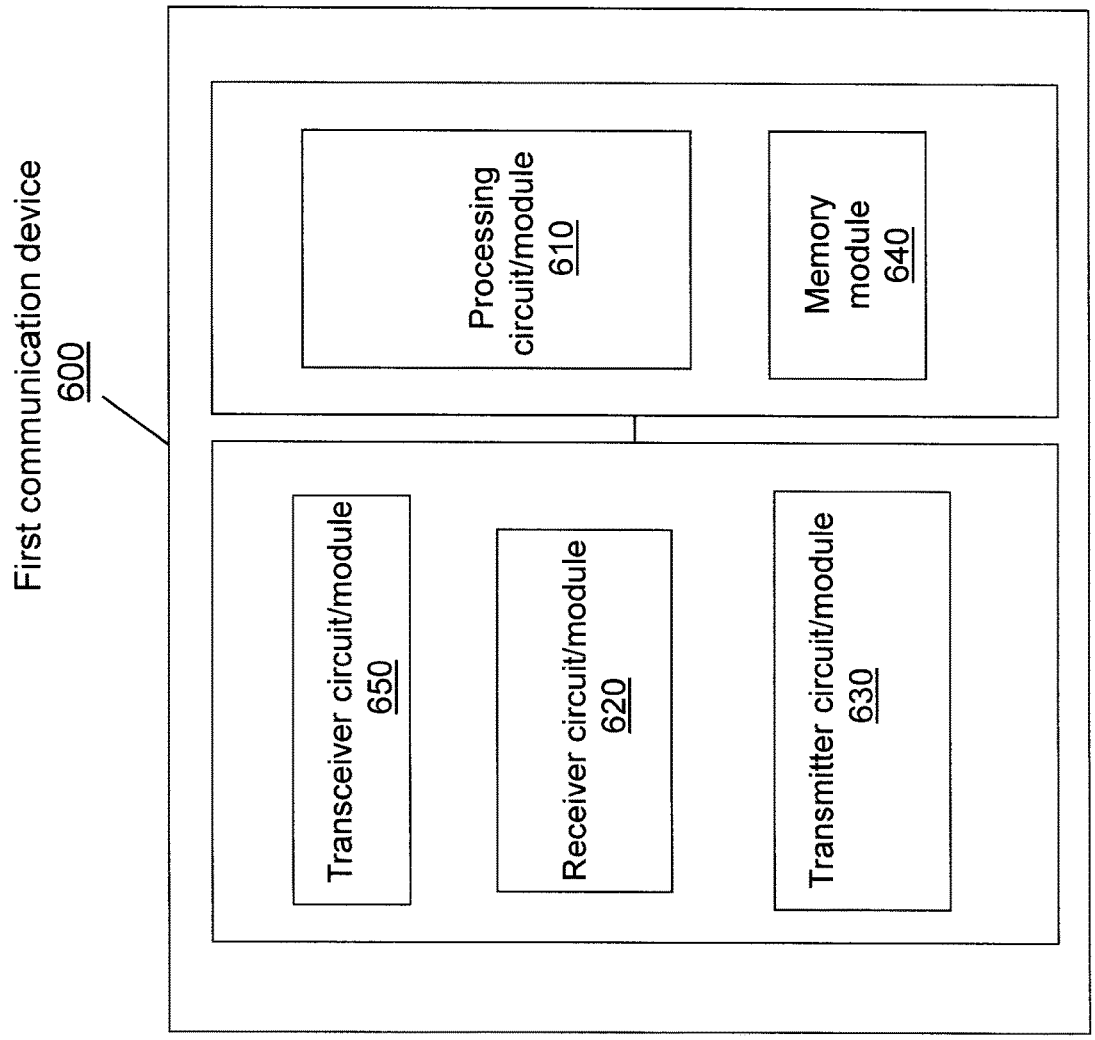
FIG. 6 is a schematic block diagram illustrating embodiments of a first communication device, according to embodiments herein.

To perform the method actions described above in relation to FIGS. 2, 3 and 4, the first communication device e.g. wireless device 131 in FIG. 1 comprises the following arrangement depicted in FIG. 6, and as described below. The first communication device 600 comprises a processing circuit or a processing module or a processor or means 610, antenna circuitry (not shown); a receiver circuit or receiver module 620; a transmitter circuit or transmitter circuit 630; a memory module 640 and a transceiver circuit or transceiver module 650 which may include the transmitter circuit 630 and the receiver circuit 620.

The first communication device may be a wireless device e.g. a mobile terminal, wireless terminal, mobile station, mobile telephone, cellular telephone, smart phone or a device-to-device (D2D) capable UE which may operate as a relay D2D device for other D2D devices. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, Machine Type Communication (MTC) devices such as sensors, e.g., a sensor equipped with UE, just to mention some examples.

The processing module/circuit 610 includes a processor, microprocessor, an application specific integrated circuit (ASIC), field programmable gate array (FPGA), or the like. Processor 610 controls the operation of the first communication device 600 and its components. Memory (circuit or module) 640 includes a random access memory (RAM), a read only memory (ROM), and/or another type of memory to store data and instructions that may be used by processor 610. The first communication device 600 may comprise additional components not shown in FIG. 6.

The receiver module/circuit 620 or the transceiver module/circuit 650 is configured to receive at Layer 1 of the first communication device 600, a discovery or D2D message transmitted from a second communication device. The processing circuit/module 610 is configured to identify a message format of the received discovery or D2D message. The processing circuit/module 610 is further configured to provide or sent decoded discovery of D2D message to higher (or upper) layer(s). According to an example, the decoded message transmitted to upper layer(s) may include an indication of the identified message format enabling the higher layer(s) of the first communication device to identity the message format. Example of discovery or D2D message formats may include a format for a relay discovery announcement; a format for a relay discovery request; a format for a discovery public safety message or a format for a discovery consumer related message.

According to an exemplary embodiment, the processing circuit or a processing module or processor or means 610 is configured to identify the message format before decoding the received message. Hence, according to another aspect of embodiments herein, the first communication device 600 is configured to: after identification of the message format of the discovery or D2D message received at Layer 1 from the second communication device/apparatus; decode, by means of the processing circuit or a processing module or processor or means 610, the received discovery or D2D message according to the identified message format followed by transmitting, by means of the processor 610, the decoded message to upper layers. As mentioned above, the decoded message to upper layers may include an indication of the identified message format enabling the higher layers of the first communication device to identity the message format.

According to an exemplary embodiment, the processing circuit or a processing module or a processor or means 610 is configured to identify the message format after decoding of the received message by means of the processing circuit or processing module or processor or means 610. Hence, according to another aspect of embodiments herein, the first communication device 600 is configured, by means of the processing circuit or processing module or processor or means 610, to decode the received message; identify the message format of the decoded discovery or D2D message and transmit the decoded message to upper layers. As mentioned above, the decoded message to upper layers may include an indication of the identified message format enabling the higher layers of the first communication device to identity the message format. Additional operations performed by the first communication device (600) have already been described e.g.

The memory module 640 may contain instructions executable by the processor 610 whereby the first communication device 600 is operative to perform the previously described method steps. There is also provided a computer program comprising computer readable code means which when run in the first communication device 600 e.g. by means of the processor 610 causes the first communication device 600 to perform the above described method steps as disclosed in relation to FIGS. 2-4, which at least include: receiving, from a second communication device, a discover or D2D message at Layer 1 of the first communication device 600; identifying a message format of the received message; decoding the received message according to the identified message format; and sending/transmitting the decoded message to higher layers (L2/L3) of the first communication device 600. As previously described, the decoding may be performed before identification of the message format.

Additional operations performed by the first communication device 600 have already been described.

For example, identification of the message format may be performed by mapping the message format to at least one reference signal sequence associated with the received discovery message. For example, the first communication device 600 may detect one or more parameters associated to one or several reference signal sequences and from such parameters determine the message format of the received discovery message.

For example, the first communication device may be pre-configured with at least one reference signal sequence and the mapping may be performed based on the reference signal sequence. For example, sequence 1 for message format 1, sequence 2 for message format 2, sequence 3 for message format 3, etc. A sequence maybe a base sequence, a group sequence, a sequence identity, a scrambling sequence, a cyclic shift, an orthogonal cover code etc. It should be noted that identification may be performed during channel estimation. In this way, by correlating the received reference signal/message to different hypothesis (e.g. with sequence 1, sequence 2 and/or sequence 3), the first communication device may know which format the received message uses. For example, if a relay announcement message received by the first communication device uses a distinguishable scrambling sequence, the first communication device may identify the received relay announcement message by associating it with the distinguishable scrambling sequence.

According to another exemplary embodiment, identification of the message format may be performed via a resource mapping scheme by mapping between resource mapping schemes of the discovery message and the associated message format. For example, mapping scheme 1 for message format 1; mapping scheme 2 for message format 2, mapping scheme for message format 3 etc. An example of a mapping scheme may be a resource location of the message. For example, the messages of different formats may be located at different time/frequency locations in a subframe carrying the message. For example, a PS message may be located at resource pool 1; a commercial message may be located at resource pool 2 and a relay announcement message may be location at resource pool 3. The resource pools may be mutually orthogonal to each other. Thus, depending on the resource location where the first communication device detects a certain discovery message, the message format is identified or obtained.

Another example of a mapping scheme may be guard period/subcarrier location. For example, the first communication device may identify the message format depending on the location of the guard period/subcarrier in the received discovery message as well as the length of the guard period/subcarrier. For example, in a resource unit comprising X subcarriers and Y symbols, where X and Y are design parameters, a guard period (in time) or guard band (in frequency) may be defined. The first communication device may identify the format of the received message including the guard time or guard period by e.g. determining the length of the guard period at the end of the message and then identify the format type. For example, the length of the guard period or guard band may be specific to the type of message received.

Another example of a mapping scheme is to make use of different cyclic prefix (CP) length for the identification. For example, different message formats may be associated to different CP lengths. As an example, a message format with a predefined length K may be identified as belonging to a PS message; a message format with a predefined length N may be identified as belonging to a commercial message; a message format with a predefined length M may be identified as belonging to relay message. K, N and M are design parameters or may be defined in a 3GPP standard specification. The operations above may be performed by the processor 610 of the first communication device.

In another exemplary embodiment, the second communication device/apparatus may provide the first communication device with information on the used message format by means of a dedicated signalling field that may be multiplexed with the discovery message that is received by the first communication device.

Figure 7:
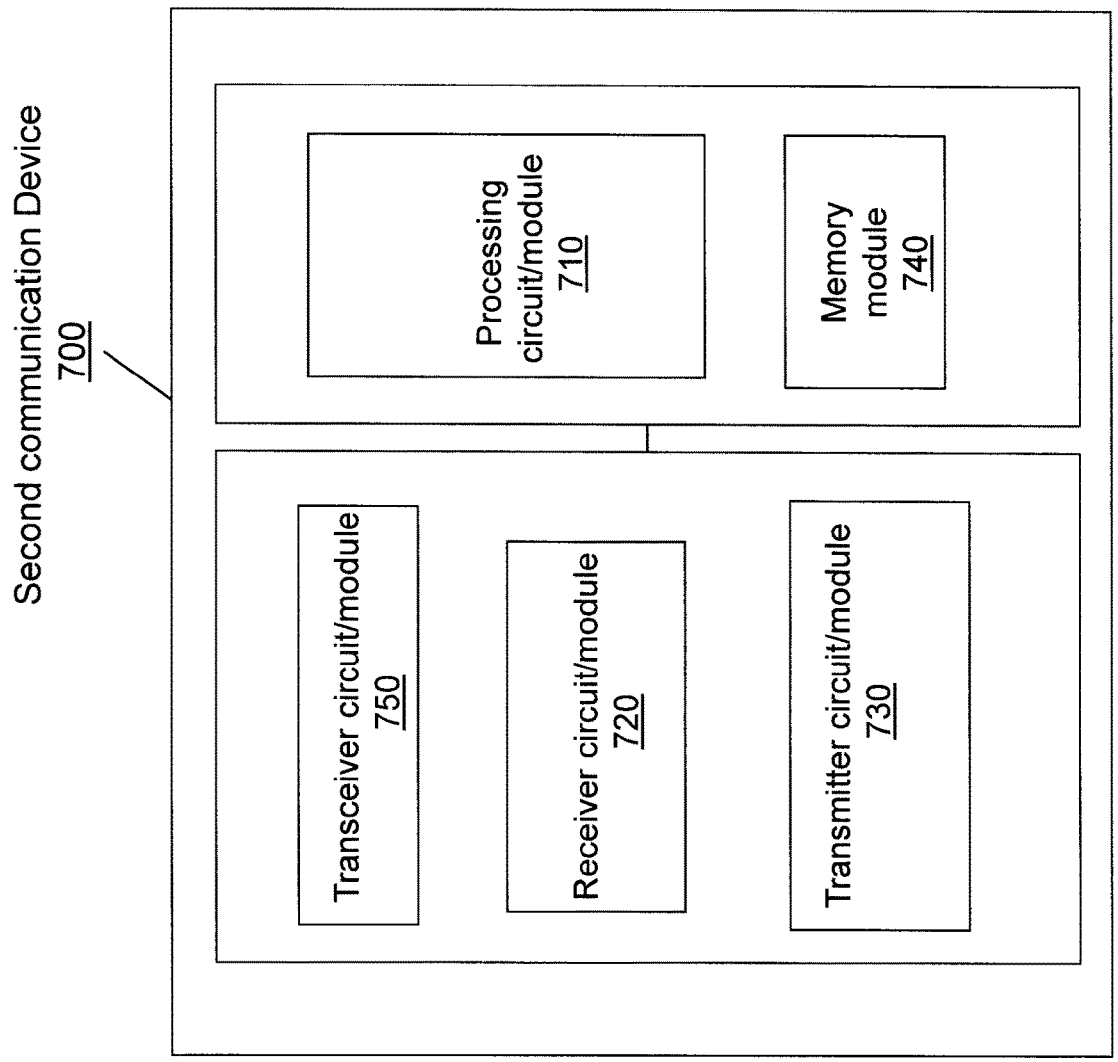
FIG. 7 is a schematic block diagram illustrating embodiments of a second communication device, according to embodiments herein.

Referring to FIG. 7, there is illustrated a block diagram illustrating embodiments of a second communication device 700 comprises a processing circuit or a processing module or a processor or means 710, antenna circuitry (not shown); a receiver circuit or receiver module 720; a transmitter circuit or transmitter circuit 730; a memory module 740 and a transceiver circuit or transceiver module 750 which may include the transmitter circuit 730 and the receiver circuit 720.

The second communication device 700 may be a wireless device e.g. a mobile terminal, wireless terminal, mobile station, mobile telephone, cellular telephone, smart phone or a device-to-device (D2D) capable UE which may operate as a relay D2D device for other D2D devices. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, Machine Type Communication (MTC) devices such as sensors, e.g., a sensor equipped with UE, just to mention some examples.

The processing module/circuit 710 includes a processor, microprocessor, an application specific integrated circuit (ASIC), field programmable gate array (FPGA), or the like. Processor 710 controls the operation of the first communication device 600 and its components. Memory (circuit or module) 740 includes a random access memory (RAM), a read only memory (ROM), and/or another type of memory to store data and instructions that may be used by processor 710. The second communication device 700 may comprise additional components not shown in FIG. 7.

The processing module/circuit 710 or processor is configured to obtain from higher layer(s) of the firs communication device, a discovery or D2D message at Layer 1 of the second communication device 700 for physical layer processing; The processing module/circuit or processor 710 is further configured to indicate, by higher layer(s), a format of the discovery message to Layer 1; and to encoding the obtained message according to the indicated message format. The transmitter circuit/module 730 is configured to transmit/send the encoded message to the first communication device 600.

According to an exemplary embodiment, the second communication device 700 may use different reference signal sequences for different message formats enabling the first communication device to map the message format with a reference signal sequence as previously described, thereby identifying the message format transmitted by the second communication device. The reference signal sequence being associated with the transmitted discovery or D2D message.

According to another exemplary embodiment, the second communication device 700 or processor of the second communication device may use different resource mapping schemes; scrambling schemes, guard period/subcarrier or cyclic prefix (CP) or CRC for different message formats as previously described.

As previously described, the message formats may comprise formats such as a public safety format, a non-public safety (i.e. commercial) format and a relay message format. All these message formats may be viewed as D2D message formats or discovery D2D message formats. The format of a discovery or D2D message may be understood as a payload format of the discovery (D2D) message, which may be different for a public safety format a non-public safety format, and a relay format. The public safety format may correspond to a first payload format, and the non-public safety format may correspond to a second payload format.

The memory module 740 may contain instructions executable by the processor 710 whereby the second communication device 700 is operative to perform the previously described method steps. There is also provided a computer program comprising computer readable code means which when run in the second communication device 700 e.g. by means of the processor 710 causes the second communication device 700 to perform the above described method steps as disclosed in relation to FIG. 5, which at least include: obtaining, from higher layer(s) of the second communication device 700, a discovery or D2D message at Layer 1 for physical layer processing; indicating, by higher layer(s), a format of the discovery message to Layer 1; encoding the obtained message according to the indicated message format; and transmitting the encoded message to the first communication device 600. Additional operations performed by the second communication device have already been described and are not unnecessarily repeated.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE has been used in this disclosure to exemplify the invention, this should not be seen as limiting the scope of the invention to only the aforementioned system. Other wireless systems, including LTE-A (or LTE-Advanced), UMTS, WiMax, and WLAN employing D2D communications may also benefit from exploiting the ideas covered within this disclosure.

What is claimed is:

1. A method in a first communication device, the method comprising:
   receiving from a second communication device, a discovery message at Layer 1 (L1) of the first communication device;
   identifying a message format of the received discovery message based on a resource mapping scheme corresponding to a resource allocation of the received discovery message, the identifying the message format including identifying whether the message format is one of a format for a relay announcement message, a format for a Public Safety (PS) discovery message and a format for a non-PS discovery message;
   if the received discovery message is a PS discovery message, the PS discovery message is located at a resource pool;
   if the received discovery message is a non-PS discovery message, the non-PS discovery message is located at a resource pool different from the location of the resource pool of the PS discovery message; and
   if the received discovery message is a relay announcement message, the relay announcement message is located at a resource pool different from the location of the resource pool of the PS discovery message and is also different from the location of the resource pool of the non-PS discovery message;
   decoding the received discovery message according to the identified message format; and
   sending the decoded discovery message to layers higher than L1 of the first communication device.

2. The method according to claim 1, wherein a location of a resource pool corresponds to at least one of a time and frequency location in a subframe in which the discovery message is received.

3. The method according to claim 1, wherein the different resource pools are mutually orthogonal to each other, so that depending on the resource location where the discovery message is received, the message format is identified.

4. The method according to claim 1, further comprising indicating the identified message format to the layers higher than L1.

5. The method according to claim 1, wherein a format of the discovery message is a payload format of the discovery message, being different depending on a message type.

6. A method in a second communication device, the method comprising:
   obtaining from layers higher than layer 1 (L1) a discovery message at L1 of the second communication device;
   indicating a message format of the discovery message to L1 based on a resource mapping scheme corresponding to a resource allocation of the obtained discovery message, the indicating the message format of the obtained discovery message including indicating whether the message format is one of a format for a relay announcement message, a format for a Public Safety (PS) discovery message and a format for a non-PS discovery message;
   if the obtained discovery message is a Public Safety (PS) discovery message, the PS discovery message is located at a resource pool;
   if the obtained discovery message is a non-PS discovery message, the non-PS discovery message is located at a resource pool different from the location of the resource pool of the PS discovery message; and
   if the obtained discovery message is a relay announcement message, the relay announcement message is located at a resource pool different from the location of the resource pool of the PS discovery message and also different from the location of the resource pool of the non-PS discovery message;
   encoding the obtained discovery message according to the indicated message format; and
   transmitting the encoded discovery message to a first communication device.

7. The method according to claim 6, wherein a location of a resource pool corresponds to at least one of a time and frequency location in a subframe in which the discovery message is obtained.

8. The method according to claim 6, wherein a format of the discovery message is a payload format of the discovery message, being different depending on a message type.

9. A first communication device comprising a processor and a memory, the memory containing instructions executable by the processor, the instructions when executed configuring the first communication device to:
   receive from a second communication device, a discovery message at Layer 1 (L1) of the first communication device;
   identify a message format of the received discovery message based on a resource mapping scheme corresponding to a resource allocation of the received discovery message, identifying the message format including identifying whether the message format is one of a format for a relay announcement message, a format for a Public Safety (PS) discovery message and a format for a non-PS discovery message;

if the received discovery message is a Public Safety (PS) discovery message, the PS discovery message is located at a resource pool;

if the received discovery message is a non-PS discovery message, the non-PS discovery message is located at a resource pool different from the location of the resource pool of the PS discovery message; and if the received discovery message is a relay announcement message, the relay announcement message is located at a resource pool different from the location of the resource pool of the PS discovery message and also different from the location of the resource pool of the non-PS discovery message;

decode the received discovery message according to the identified message format; and send the decoded discovery message to layers higher than L1 of the first communication device.

10. The first communication device according to claim 9, wherein a location of a resource pool corresponds to at least one of a time and frequency location in a subframe in which the discovery message is received.

11. The first communication device according to claim 9, wherein the different resource pools are mutually orthogonal to each other, so that depending on the resource location where the discovery message is received, the message format is identified.

12. The first communication device according to claim 9, further configured to indicate the identified message format to the layers higher than L1.

13. The first communication device according to claim 9, wherein a format of the discovery message is a payload format of the discovery message, being different depending on a message type.

14. A second communication device comprising a processor and a memory, the memory containing instructions executable by the processor, the instructions when executed configuring the second communication device to:

obtain from layers higher than layer 1 (L1) a discovery message at layer 1 of the second communication device;

indicate a message format of the discovery message to L1 based on a resource mapping scheme corresponding to a resource allocation of the obtained discovery message, indicating the message format includes indicating whether the message format is one of a format for a relay announcement message, a format for a Public Safety (PS) discovery message and a format for a non-PS discovery message;

if the obtained discovery message is a Public Safety (PS) discovery message, the PS discovery message is located at a resource pool;

if the obtained discovery message is a non-PS discovery message, the non-PS discovery message is located at a resource pool different from the location of the resource pool of the PS discovery message; and if the obtained discovery message is a relay announcement message, the relay announcement message is located at a resource pool different from the location of the resource pool of the PS discovery message and also different from the location of the resource pool of the non-PS discovery message;

encode the obtained discovery message according to the indicated message format; and transmit the encoded discovery message to a first communication device.

15. The second communication device according to claim 14, wherein a location of a resource pool corresponds to at least one of a time and frequency location in a subframe in which the discovery message is obtained.

16. The second communication device according to claim 15, wherein a format of the discovery message is a payload format of the discovery message, being different depending on a message type.

* * * * *